United States Patent
Wang et al.

(10) Patent No.: US 9,591,358 B2
(45) Date of Patent: Mar. 7, 2017

(54) MEDIA PLAYBACK WORKLOAD SCHEDULER

(71) Applicant: INTEL CORPORATION, Santa Clara, CA (US)

(72) Inventors: Changliang Wang, Bellevue, WA (US); Akshat Nanda, El Dorado Hills, CA (US); Hao Feng, Shanghai (CN); Yunbiao Lin, Shanghai (CN)

(73) Assignee: Intel Corporation, Santa Clara, CA (US)

(*) Notice: Subject to any disclaimer, the term of this patent is extended or adjusted under 35 U.S.C. 154(b) by 503 days.

(21) Appl. No.: 13/844,163

(22) Filed: Mar. 15, 2013

(65) Prior Publication Data
US 2014/0270722 A1   Sep. 18, 2014

(51) Int. Cl.
  *H04N 5/917* (2006.01)
  *H04N 21/443* (2011.01)
(52) U.S. Cl.
  CPC ....... *H04N 21/4436* (2013.01); *H04N 21/443* (2013.01)
(58) Field of Classification Search
  CPC ................. H04N 21/443; H04N 21/4436
  USPC ......... 348/459, 558; 345/541; 386/353, 355; 718/104
  See application file for complete search history.

(56) References Cited

U.S. PATENT DOCUMENTS

| | | | | |
|---|---|---|---|---|
| 6,012,089 | A * | 1/2000 | Hasegawa ............ | H04N 7/147 348/E7.069 |
| 7,676,142 | B1 * | 3/2010 | Hung .................. | G11B 27/005 348/446 |
| 2002/0130970 | A1 * | 9/2002 | Jiang ............................ | 348/459 |
| 2002/0191501 | A1 * | 12/2002 | Ueno ..................... | B82Y 10/00 369/44.13 |
| 2007/0186022 | A1 * | 8/2007 | Ren ........................ | G06F 13/24 710/260 |
| 2009/0070119 | A1 | 3/2009 | Yoo et al. | |
| 2009/0285310 | A1 * | 11/2009 | Iwami ..................... | H04N 5/04 375/240.25 |
| 2009/0313621 | A1 * | 12/2009 | Dewa ............... | G11B 20/00086 718/1 |
| 2010/0142624 | A1 * | 6/2010 | Fujita ................ | H04N 21/4307 375/240.25 |

(Continued)

FOREIGN PATENT DOCUMENTS

| CN | 101784976 A | 7/2010 |
|---|---|---|
| CN | 101976207 A | 2/2011 |

(Continued)

OTHER PUBLICATIONS

Taiwan IPO Search Report, Application No. 103106274, completed Dec. 10, 2015, 2 pages.

(Continued)

*Primary Examiner* — Thai Tran
*Assistant Examiner* — Mishawn Hunter
(74) *Attorney, Agent, or Firm* — International IP Law Group, P.L.L.C.

(57) ABSTRACT

An apparatus, a computing device, a media playback workload scheduler, and a computer readable medium are described herein. The apparatus includes media playback workload scheduling logic to allocate a plurality of media frames for batch media processing, logic to process the media frames, and logic to render the processed media frames.

23 Claims, 8 Drawing Sheets

(56) References Cited

U.S. PATENT DOCUMENTS

| | | | |
|---|---|---|---|
| 2013/0057563 A1 | 3/2013 | Persson | |
| 2013/0125130 A1* | 5/2013 | Stubbs et al. ................. | 718/104 |
| 2013/0152108 A1* | 6/2013 | Jiang ..................... | G09G 5/363 |
| | | | 719/321 |
| 2014/0026137 A1* | 1/2014 | Vembu ................. | G06F 9/4881 |
| | | | 718/102 |
| 2014/0160138 A1* | 6/2014 | Nalluri et al. ................ | 345/541 |

FOREIGN PATENT DOCUMENTS

| | | |
|---|---|---|
| CN | 102859492 A | 1/2013 |
| CN | 102866765 A | 1/2013 |
| TW | 200926145 A | 6/2009 |
| TW | 201207735 A | 2/2012 |

OTHER PUBLICATIONS

CN Search Report, CN Application No. 2014100972639, dated Sep. 18, 2016, 1 page.

\* cited by examiner

700

MEDIA PLAYBACK WORKLOAD SCHEDULER

BACKGROUND ART

Computing systems typically use a central processing unit (CPU), a graphics processing unit (GPU), or any combination thereof to playback media. For example, a CPU may perform software based video decode, process, and rendering functions during media playback. The GPU may be used for accelerated hardware decode, process, and rendering functions during media playback. The media playback occurs on a frame by frame basis. During the media playback, the CPU and GPU transition between several computing operating states, or C-states. The C-states indicate various states where unused portions of the CPU or GPU are powered down in order to save power. A C0 state refers to a high power operating state. A Cx state for the GPU refers to a lower power state when compared to a C0 state, where one or more engines of the GPU are in a sleep state to reduce power consumption. Similarly, a Cx state for the CPU refers to a lower power state when compared to a C0 state, where one or more cores of the CPU are in a sleep state to reduce power consumption.

BRIEF DESCRIPTION OF THE DRAWINGS

The same numbers are used throughout the disclosure and the figures to reference like components and features. Numbers in the 101 series refer to features originally found in FIG. 1; numbers in the 200 series refer to features originally found in FIG. 2; and so on.

DESCRIPTION OF THE EMBODIMENTS

Figure 1:
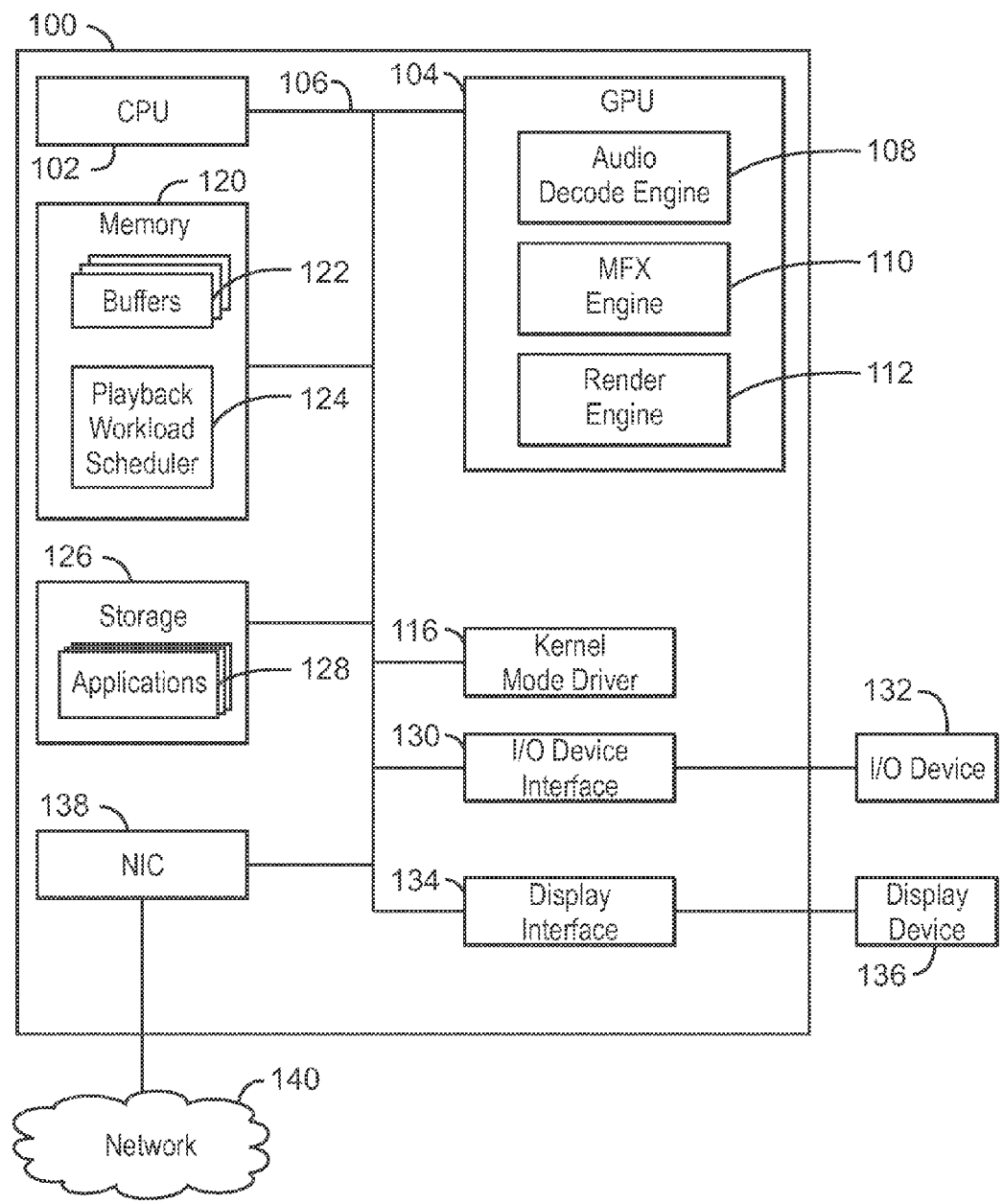
FIG. 1 is a block diagram of a computing device that may be used to schedule media playback workloads.

The CPU and the GPU may decode a frame in a C0 state and then transition to a Cx state when the frame decode is complete. A frame is a still image that is captured or rendered over an interval of time in order to record or render a video. The number of frames that are captured or rendered over a particular time interval is known as the frame rate. For example, frames may be captured or rendered at 30 frames per second (FPS), 60 FPS, or any other frame rate. In this manner, when the video is played each frame is rendered on a display for a short period of time. The process used to restore the CPU or the GPU to a high power operating state from a low power operating state is referred to as a context restore. The context restore can consume power in restoring the data used by the portion of the CPU or GPU that is transitioning to the C0 state. Further, power is consumed when saving the context during a transition from a C0 state to a Cx state.

Interrupts can prevent the CPU from transitioning into its lowest power Cx state. During media playback, the GPU will generate several interrupts that are used to enable coordination of processing of the media playback workload. For example, an audio decode interrupt, frame decode interrupt, post-processing interrupt, and a rendering interrupt may be generated by the GPU to the CPU in order to identify the GPU progress in processing the workload. The interrupts may be generated on a task basis, a frame basis, or at a timing interval.

Embodiments described herein relate to a media playback workload scheduler. The media playback workload scheduler can reduce power consumption during media playback and recording. A playback workload may be decoded and post processed using a plurality of frames. The plurality of frames is a batch of N of frames, where N is determined using the memory allocation of the computing device. The plurality of frames are then rendered while the CPU and GPU enter a Cx state. The number of interrupts generated is reduced, enabling the CPU and the GPU to enter a deeper Cx state.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing device 100 that may be used to schedule media playback workloads. The computing device 100 may be, for example, a laptop computer, desktop computer, tablet computer, mobile device, server, or cellular phone, among others. The computing device 100 may include a central processing unit (CPU) 102 that is configured to execute stored instructions, as well as a memory device 120 that stores instructions that are executable by the CPU 102. The CPU 102 can be a single core processor, a multi-core processor, a computing cluster, or any number of other configurations. Furthermore, the computing device 100 may include more than one CPU 102. The instructions that are executed by the CPU 102 may be used to schedule a media playback workload.

The computing device 100 may also include a graphics processing unit (GPU) 104. As shown, the CPU 102 may be connected through a bus 106 to the GPU 104. However, in some embodiments, the CPU 102 and the GPU 104 are located on the same die. The GPU 104 may be configured to perform any number of graphics operations within the computing device 100. For example, the GPU 104 may be configured to render or manipulate graphics images, graphics frames, videos, or the like, to be displayed to a user of the computing device 100.

The GPU 104 may also include a audio decode engine 108, multi-format codec (MFX) engine 110, and a render engine 112. An engine is a component of the GPU 104 that may be used for parallel processing of data sent to the GPU 104. Although three GPU engines are shown, the GPU may contain any number of engines. The audio decode engine 108 may process audio data in parallel with the MFX engine 110. The MFX engine 110 decodes frame data sent to the GPU 104. The image data is sent to the MFX engine 110 as a sequence of frames.

The render engine 112 may be used to apply video post processing to the plurality of frames after they have been decoded by the MFX engine 110. The post processing includes image stabilization, frame rate conversion, gamma correction enhancement, skin tone enhancement, frame rate reduction, and frame size may also be modified in order to adjust the media workload. In embodiments, the audio tracks are also post processed. Audio post processing includes speaker compensation, volume adjustments, and virtualization.

The memory device 120 can include random access memory (RAM), read only memory (ROM), flash memory, or any other suitable memory systems. For example, the memory device 120 may include dynamic random access memory (DRAM). The memory device includes a batch of buffers 122 and a workload scheduler 124. The buffers 122 may be used to provide storage for N frames and N audio track as they are processed by the audio decode engine 108, the MFX engine 110, and the render engine 112. In this manner, the frames are not processed at an N-frame granularity. In embodiments, the buffers 122 are DMA buffers. The playback workload scheduler 124 allocates the buffers 122. Based on the size of the allocated buffers, the playback workload scheduler 124 determines the number of N frames and N tracks that can be stored in the buffers. The playback workload scheduler 124 also schedules the N frames and the corresponding N audio tracks for decoding. The audio associated with a particular frame may be decoded into a format recognized by the system using the audio decode engine 108. The frames may be decoded into a format recognized by the system using the MFX engine 110.

The playback workload scheduler 124 also schedules the decoded N frames for video post-processing using the render engine 112. In embodiments, the plurality of frames are decoded using the MFX engine and then stored in a buffer 124. The render engine 112 retrieves the N decoded frames from the buffer 124. In embodiments, if there is a dependency on the buffer, the playback workload scheduler 124 may insert a buffer dependency flag within the buffer 124. The buffer dependency flag enables a kernel mode driver (KMD) 116 to insert a GPU semaphore wait.

In embodiments, features of the playback workload may be modified in order to fit within the allocated buffers 124. For example, video post processing such as image stabilization, frame rate conversion, gamma correction enhancement, skin tone enhancement, frame rate reduction, and frame size may be modified in order to adjust the media workload may be modified or disabled such that a batch of N frames may be stored in the allocated buffers when being processed by the graphics hardware.

The computing device 100 may include a storage 126. The storage 126 is a physical memory such as a hard drive, an optical drive, a thumbdrive, an array of drives, or any combinations thereof. The storage 126 may also include remote storage drives. The storage may also include one or more media applications 128. In embodiments, the applications 128 include an application for media playback.

The CPU 102 may also be connected through the bus 106 to an input/output (I/O) device interface 130 configured to connect the computing device 100 to one or more I/O devices 132. The I/O devices 132 may include, for example, a keyboard and a pointing device, wherein the pointing device may include a touchpad or a touchscreen, among others. The I/O devices 132 may be built-in components of the computing device 100, or may be devices that are externally connected to the computing device 100.

The CPU 102 may also be linked through the bus 106 to a display interface 134 configured to connect the computing device 100 to a display device 136. The display device 136 may include a display screen that is a built-in component of the computing device 100. The display device 136 may also include a computer monitor, television, or projector, among others, that is externally connected to the computing device 100. A network interface controller (NIC) 138 may be configured to connect the computing device 100 through the bus 106 to a network 140. The network 140 can be a wire line network, a wireless network, or a cellular network. The network 140 may be any wide area network (WAN), any local area network (LAN), or the Internet, among others. For example, network 140 can be 3GPP LTE network or a WiFi network.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
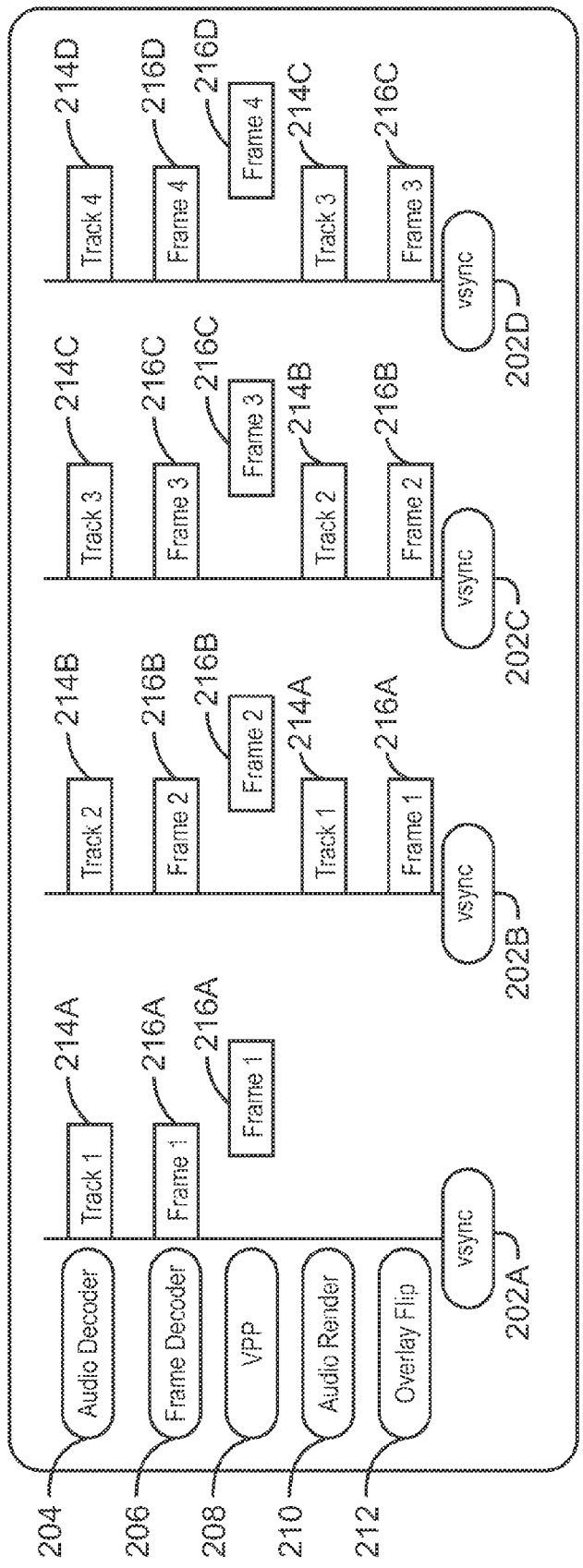
FIG. 2 is an illustration of a media playback workload.

FIG. 2 is an illustration 200 of a media playback workload. The media playback includes four vertical synchronization (vsync) cycles at reference numbers 202A, 202B, 202C, and 202D. The media playback also includes five functions, an audio decode 204, a frame decode 206, a video post-process 208, an audio render 210, and an overlay flip 212. In embodiments, the audio decoder 204, the decoder 206, the video post-processor 208, the audio render 210, and the overlay flip 212 are included in a graphics rendering pipeline. Moreover, in embodiments, the audio decode 204 is performed using the audio decode engine 108 (FIG. 1), the frame decode 206 is performed using the MFX engine 110 (FIG. 1), and the video post-process 208 is performed using the render engine 112 (FIG. 1). The overlay flip function refers to rendering an image for display from a surface, where the surface is a buffer that contains data to be rendered. After each function, the resulting data is written to a buffer where it remains until the next function retrieves the data for further processing. In embodiments, the buffers are direct memory access (DMA) buffers.

The playback of a video occurs over several vsync cycles. The term vertical synchronization, or vsync, refers to a process by which the rate that frames are processed by graphics hardware is synchronized with the rate at which the frames are rendered by graphics hardware. For example, vsync can be used to synchronize the rate at which a video card processes frames with the rate that a monitor can render the frames, also known as the refresh rate of the monitor. Using vsync, the buffers used to hold frames that are to be rendered are not updated with any new frames for rendering until the monitor refreshes. In this manner, each frame is held in a buffer until it is retrieved for rendering when the monitor refreshes. After the monitor refreshes, the next vsync cycle begins, and the next set of frames may be placed in the buffer for rendering.

As shown in FIG. 2, a track1 214A is processed using the audio decode 204 during the first vsync cycle 202A. A frame1 216A is processed using the decode 206. Within the same cycle, the data resulting from processing the frame1 216A may be retrieved from a buffer and processed using the video post-process 208.

During the next vsync cycle 202B, the track1 214A is rendered using the audio render 210, and the frame1 216A is rendered using the overlay flip 212. Further, a track2 214B is processed using the audio decode 204, and a frame2 216B is processed using the decode 206. Similar to the first vsync cycle, the data resulting from processing the frame2 216B using the decode 206 may be placed in a buffer, and the data may be retrieved and processed using the video post process 208 in the same vsync cycle 202B.

During the third vsync cycle 202C, the track2 214B is rendered using the audio render 210, and the frame2 216B is rendered using the overlay flip 212. Further, a track3 214C is processed using the audio decode 204, and a frame3 216C is processed using the decode 206. Similar to the first and second vsync cycles, the data resulting from processing the frame3 216C using the decode 206 may be placed in a buffer, and the data may be retrieved and processed using the video post processing 208 in the same vsync cycle 202C.

During the fourth vsync cycle 202D, the track3 214C is processed using the audio render 210, and the frame3 216C is processed using the overlay flip 212. Further, a track4 214D is processed using the audio decode 204, and a frame4 216D is processed using the decode 206. Similar to the three vsync cycles, the data resulting from processing the frame4 216D using the decode 206 may be placed in a buffer, and the data may be retrieved and processed using the video post processing 208 in the same vsync cycle 202D.

For each audio decode, frame decode, video post process, and overlay flip performed on each frame, the GPU will send an interrupt to the CPU in order to coordinate the video processing with the CPU. Accordingly, during the processing of the four frames shown in FIG. 2, sixteen interrupts are sent to the CPU. The interrupts prevent the CPU from entering a low power Cx state.

Figure 3:
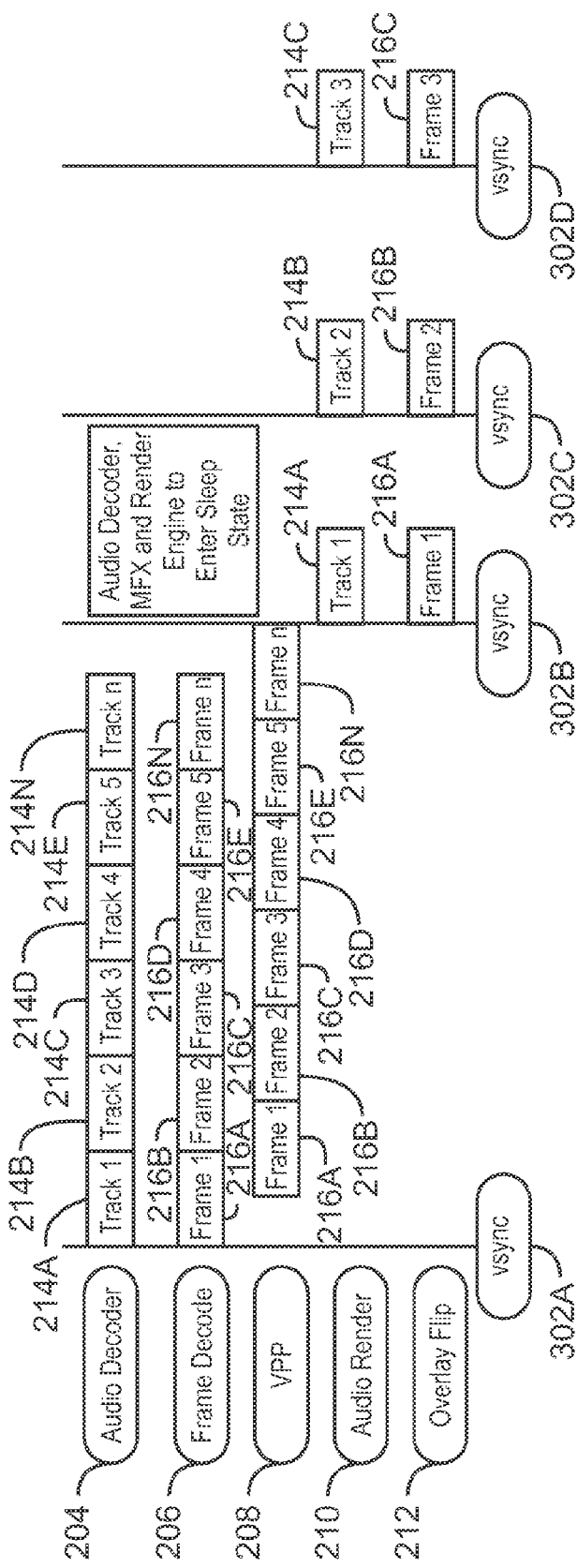
FIG. 3 is an illustration of another media playback workload.

FIG. 3 is an illustration 300 of another media playback workload. During the first vsync cycle 302A, a batch of tracks 214A-214N is processed using the audio decode 204. Additionally, a batch of frames 216A-216N are processed using the decode 206. The data resulting from processing the batch of frames 216A-216N using the decode 206 may be placed in a buffer, and the data may be retrieved and processed using the video post processing 208 in the same vsync cycle 302A.

During subsequent vsync cycles, each frame of the batch of frames 216A-216N may be rendered along with the corresponding track from the batch of tracks 214A-214N. Accordingly, at the vsync cycle 302B a track1 214A and a frame1 216A are rendered using the audio render 210 and the overlay flip 212, respectively. Further, at the vsync cycle 302C, a track2 214B and a frame2 216B are rendered using the audio render 210 and the overlay flip 212, respectively. During the vsync cycle where the last track and frame of the batch of tracks 214A-214N and the batch of frames 216A-216N are rendered, the audio decoder 204, decode 206 and video post processing 208 may be used to process another batch of N tracks and another batch of N frames.

By processing a batch of tracks and a batch of frames in a single vsync cycle, the audio decode, frame decode, and video post process are not used in the subsequent vsync cycles where the batch of tracks and the batch of frames are rendered. Accordingly, the various cores of the CPU may enter a low power Cx state as no interrupts are generated for several vsync cycles. A single interrupt indicating an overlay flip will be generated for the last frame of the batch of frames, while the remaining frames do not generate an interrupt. In this manner, the overlay flip may render the N frames and N audio tracks with one interrupt sent to the CPU. Further, various engines of GPU and cores of the CPU may transition to a sleep state, as they are not in use. In this manner, the number of C-state transitions may be reduced during media playback, resulting in reduced power consumption. In embodiments, the media playback workload scheduler can schedule the workload by using a GPU semaphore. The GPU semaphore is used to signal the dependencies between various execution units within the GPU. The signal may be a flag that is inserted into a buffer to indicate a dependency between execution units. Before accessing the data within the buffer, the particular execution unit of the GPU will wait on a task of another execution unit to complete if there is a dependency indicated. No interrupt is generated when GPU semaphores are used to indicate dependencies.

Figure 4:
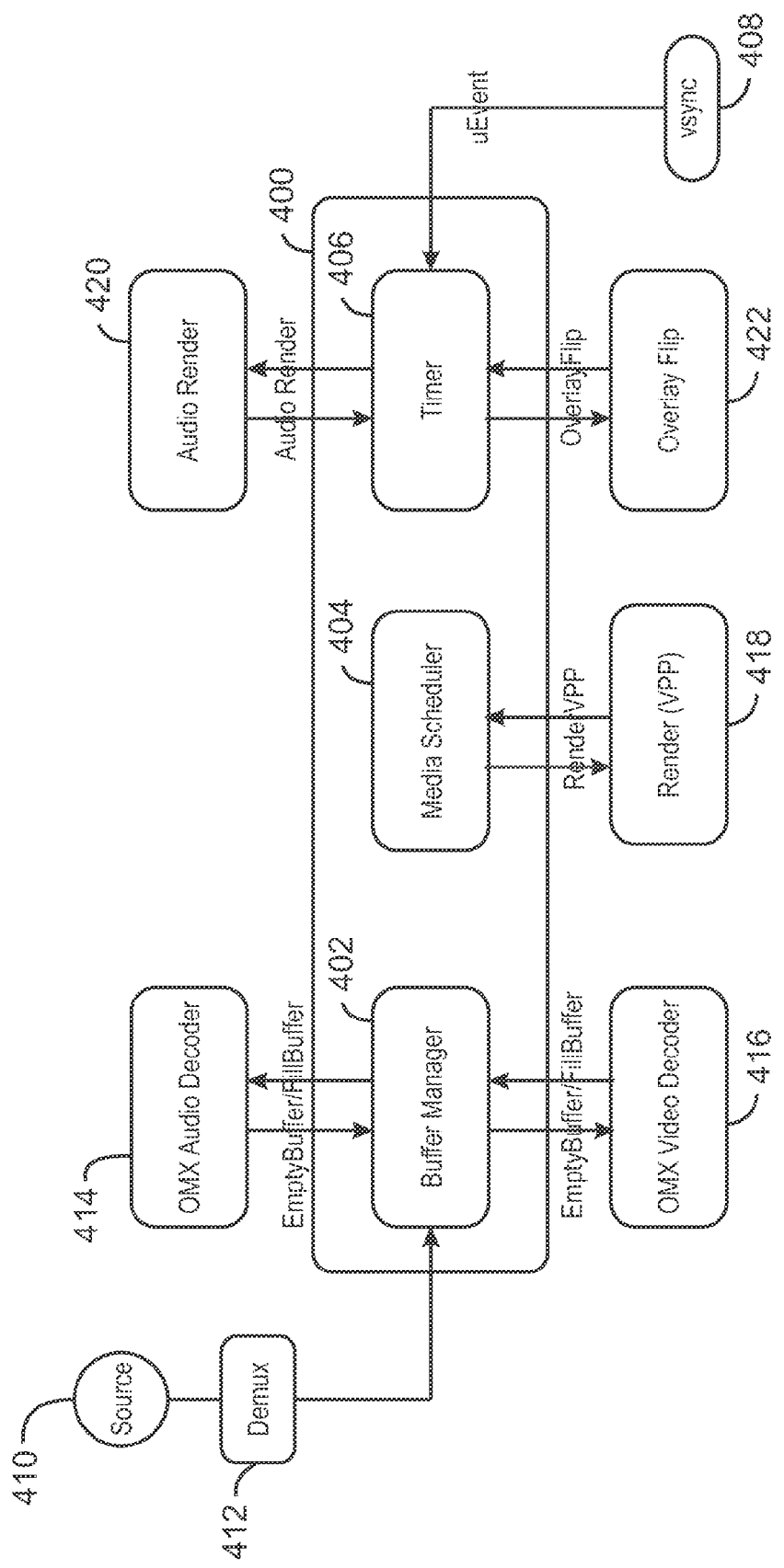
FIG. 4 is a block diagram of a media playback workload scheduler.

FIG. 4 is a block diagram of a media playback workload scheduler 400. The media playback workload scheduler 400 includes a buffer manager 402, a media scheduler 404, and a timer 406. The buffer manager 402 allocates one or more buffers for the batch of N frames and the corresponding batch of N tracks. The media scheduler 404 determines how many N frames can be decoded in one batch so that the buffers can support the entire batch of frames. The media scheduler 404 also determines at what point a batch of N frames is to be decoded. For example, the N frames may be decoded during the vsync cycle wherein the last frame from a previous batch of frames is rendered or displayed to a user. Additionally, the media scheduler 404 may also schedule the processing of the frames and determine when to overlay flip the processed frames based on a vsync event 408. The timer 406 monitors the vsync events by obtaining the vsync event 408 from the kernel mode driver (KMD). The timer may begin a new vsync cycle each time a vsync event 408 is received from the KMD.

A source 410 and a demultiplexor 412 provide input to the media playback workload scheduler 400. In examples, the source 410 may be a DVD player or a Blu-Ray player. The demultiplexor 412 receives data from the source 408 and separates the frames from the tracks. The frames and tracks are then sent to the media playback workload scheduler 400. In embodiments, an audio decoder 414, a video decoder 416, a render video post-processor (VPP) 418, an audio renderer 420 and an overlay flip 422 are OpenMax components that are coupled to the media playback workload scheduler 400. OpenMax is a set of media interfaces that can be used to process a media playback workload. The audio decoder 414 and the video decoder 416 may obtain batches of tracks and batches of frames from one or more buffers using the buffer manager 402. The render VPP 418 may the schedule the processed frames and tracks for video post processing. After video post processing the media scheduler 404 determines when to render the audio using audio render 420 and when to overlay flip the frames to the user using overlay flip 422.

Figure 5:
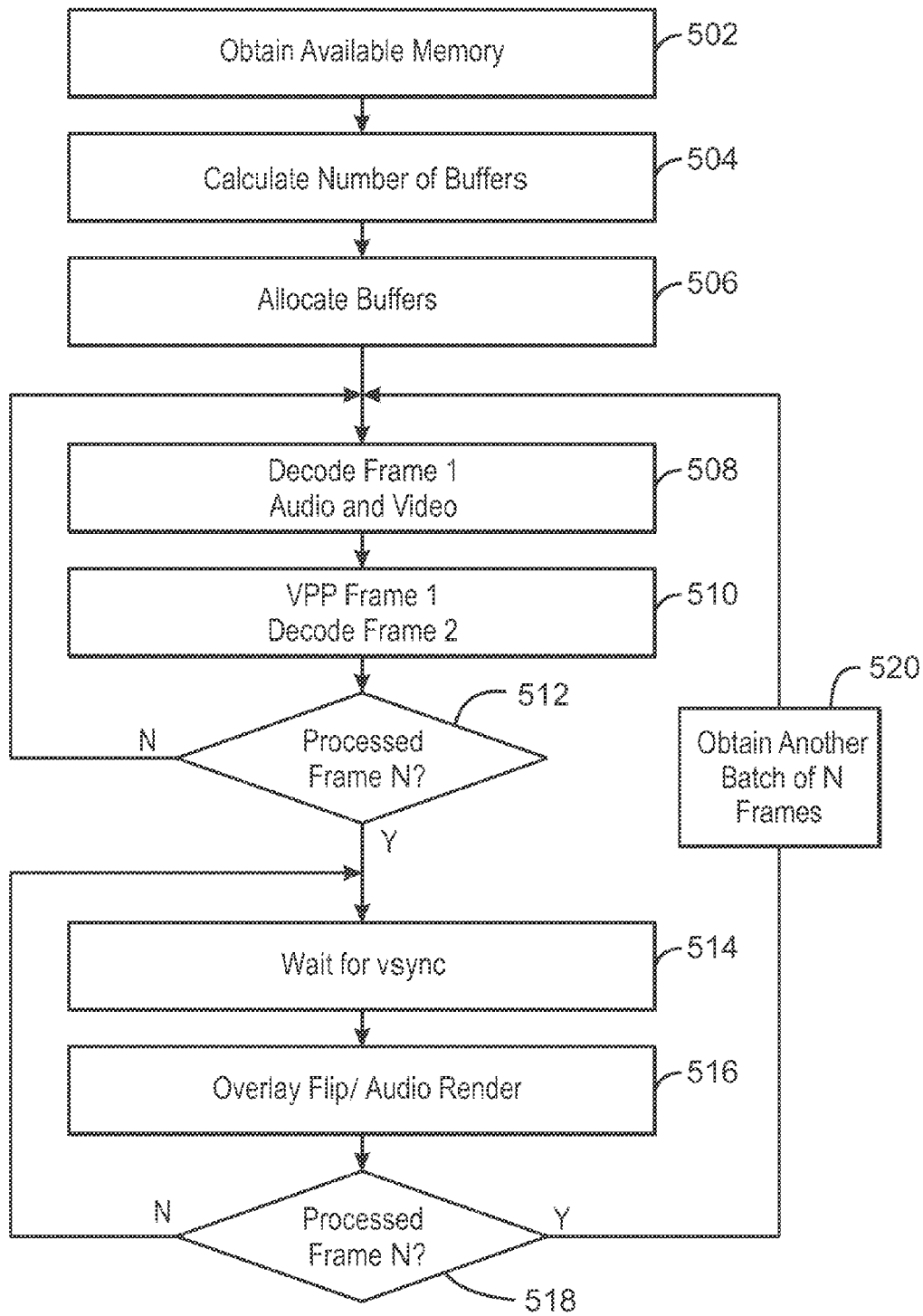
FIG. 5 is a process flow diagram of a media playback workload scheduler.

FIG. 5 is a process flow diagram 500 of a media playback workload scheduler. At block 502, scheduler obtains the available physical memory and video memory size. At block 504, the scheduler calculates the size and number of buffers that can be allocated based on input stream size, video screen size, and amount of memory available. At block 506, the scheduler allocates input and output buffers for N frames and N associated tracks. In some embodiments, media playback workload scheduling logic may allocate a plurality of media frames for batch media processing. Further, in some embodiments, the plurality of media frames is a batch of N frames with a plurality of corresponding tracks, and a plurality of tracks is a batch of N tracks.

At block 508, the first frame1 and track1 are decoded. At block 510, the second frame2 and track2 are decoded, and frame1 is video post processed. In embodiments, if there is a dependency on the buffer, the media playback workload scheduler inserts buffer dependency flag to allow KMD to insert a GPU semaphore wait. At block 512, the scheduler determines if all of the batch of frames and the batch of tracks within the buffers have been processed. If the batch of frames and the batch of tracks within the buffers have been processed, process flow continues to block 514. If the batch of frames and the batch of tracks within the buffers have not been processed, process flow returns to block 508 where the remaining frames and tracks are processed. In this manner, the frames and audio will not be rendered until all the buffers have been decoded and processed.

At block 514, the scheduler waits for the next vsync cycle. At block 516, upon next vsync cycle, the scheduler sends out the first frame for rendering. The scheduler sends out the second frame upon the next vsync cycle. In embodiments, the scheduler may also perform frame rate conversion based on the display refresh rate and the FPS setting of the video playback. At block 516, the scheduler determines if all frames and tracks of the batch of N frames and N tracks have been rendered. If the batch of N frames and N tracks have not been rendered, the process flow returns to block 514 to wait for the next vsync cycle to render another frame and track. If the batch of N frames and N tracks have been rendered, process flow continues to block 520. At block 520 another batch of N frames and another batch of N tracks are obtained. Process flow then returns to block 508 where the batch of N frames and the batch of N tracks are processed.

By enabling the audio decoder, decoder, and VPP to enter a sleep state, power may be saved during media playback. Particularly, the CPU and the GPU can both reduce the power used during media playback. In embodiments, buffering the frames and the associated tracks enables most of the data processed by the GPU to be stored in the cache of the GPU. In this manner, the GPU can use less power by not pulling data from storage and having most data accessible in the cache when called. Further, power is saved by having less frequent power state transitions. For example, transitioning the GPU from a low power state to high power state may use more power when compared to transitioning the CPU from a low power state to a high power state.

Figure 6:
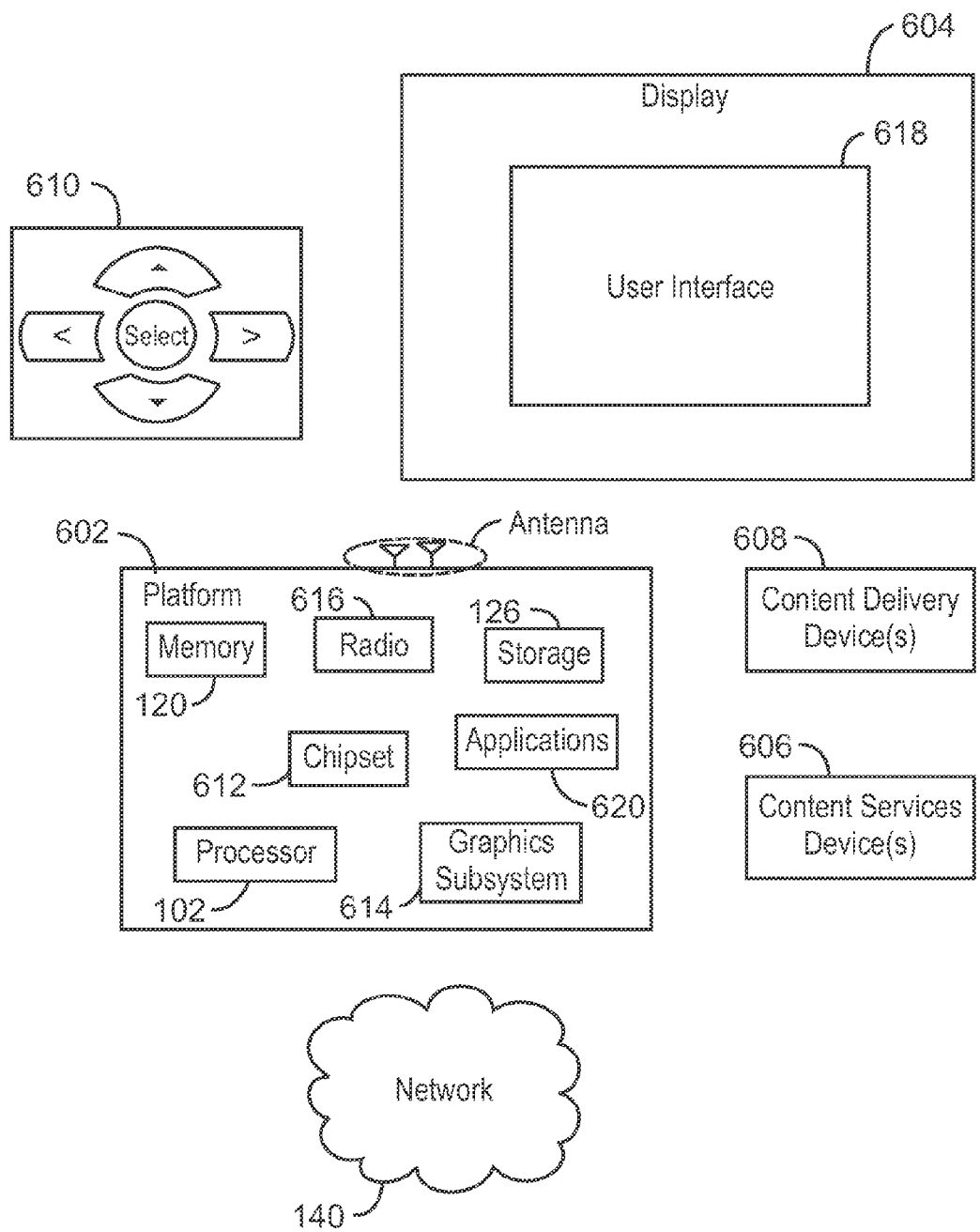
FIG. 6 is a block diagram of an exemplary system that executes a media playback workload scheduler.

FIG. 6 is a block diagram of an exemplary system 600 that executes a media playback workload scheduler. Like numbered items are as described with respect to FIG. 1. In some embodiments, the system 600 is a media system. In addition, the system 600 may be incorporated into a personal computer (PC), laptop computer, ultra-laptop computer, server computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, a printing device, an embedded device or the like.

In various embodiments, the system 600 comprises a platform 602 coupled to a display 604. The platform 602 may receive content from a content device, such as content services device(s) 606 or content delivery device(s) 608, or other similar content sources. A navigation controller 610 including one or more navigation features may be used to interact with, for example, the platform 602 and/or the display 604. Each of these components is described in more detail below.

The platform 602 may include any combination of a chipset 612, a central processing unit (CPU) 102, a memory device 120, a storage device 126, a graphics subsystem 614, applications 620, and a radio 616. The chipset 612 may provide intercommunication among the CPU 102, the memory device 120, the storage device 126, the graphics subsystem 614, the applications 620, and the radio 616. For example, the chipset 612 may include a storage adapter (not shown) capable of providing intercommunication with the storage device 126.

The CPU 102 may be implemented as Complex Instruction Set Computer (CISC) or Reduced Instruction Set Computer (RISC) processors, x86 instruction set compatible processors, multi-core, or any other microprocessor or central processing unit (CPU). In some embodiments, the CPU 102 includes multi-core processor(s), multi-core mobile processor(s), or the like. The memory device 120 may be implemented as a volatile memory device such as, but not limited to, a Random Access Memory (RAM), Dynamic Random Access Memory (DRAM), or Static RAM (SRAM). The storage device 126 may be implemented as a non-volatile storage device such as, but not limited to, a magnetic disk drive, optical disk drive, tape drive, solid state drive, an internal storage device, an attached storage device, flash memory, battery backed-up SDRAM (synchronous DRAM), and/or a network accessible storage device. In some embodiments, the storage device 126 includes technology to increase the storage performance enhanced protection for valuable digital media when multiple hard drives are included, for example.

The graphics subsystem 614 may perform processing of images such as still or video for display. The graphics subsystem 614 may include a graphics processing unit (GPU), such as the GPU 104, or a visual processing unit (VPU), for example. An analog or digital interface may be used to communicatively couple the graphics subsystem 614 and the display 604. For example, the interface may be any of a High-Definition Multimedia Interface, DisplayPort, wireless HDMI, and/or wireless HD compliant techniques. The graphics subsystem 614 may be integrated into the CPU 102 or the chipset 612. Alternatively, the graphics subsystem 614 may be a stand-alone card communicatively coupled to the chipset 612.

The graphics and/or video processing techniques described herein may be implemented in various hardware architectures. For example, graphics and/or video functionality may be integrated within the chipset 612. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 616 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 616 may operate in accordance with one or more applicable standards in any version.

The display 604 may include any television type monitor or display. For example, the display 604 may include a computer display screen, touch screen display, video monitor, television, or the like. The display 604 may be digital and/or analog. In some embodiments, the display 604 is a holographic display. Also, the display 604 may be a transparent surface that may receive a visual projection. Such projections may convey various forms of information, images, objects, or the like. For example, such projections may be a visual overlay for a mobile augmented reality (MAR) application. Under the control of one or more applications 620, the platform 602 may display a user interface 618 on the display 604.

The content services device(s) 606 may be hosted by any national, international, or independent service and, thus, may be accessible to the platform 602 via the Internet, for example. The content services device(s) 606 may be coupled to the platform 602 and/or to the display 604. The platform 602 and/or the content services device(s) 606 may be coupled to a network 140 to communicate (e.g., send and/or receive) media information to and from the network 140. The content delivery device(s) 608 also may be coupled to the platform 602 and/or to the display 604.

The content services device(s) 606 may include a cable television box, personal computer, network, telephone, or Internet-enabled device capable of delivering digital information. In addition, the content services device(s) 606 may include any other similar devices capable of unidirectionally or bidirectionally communicating content between content providers and the platform 602 or the display 604, via the network 140 or directly. It will be appreciated that the content may be communicated unidirectionally and/or bidirectionally to and from any one of the components in the system 600 and a content provider via the network 140. Examples of content may include any media information including, for example, video, music, medical and gaming information, and so forth.

The content services device(s) 606 may receive content such as cable television programming including media information, digital information, or other content. Examples of content providers may include any cable or satellite television or radio or Internet content providers, among others.

In some embodiments, the platform 602 receives control signals from the navigation controller 610, which includes one or more navigation features. The navigation features of the navigation controller 610 may be used to interact with the user interface 618, for example. The navigation controller 610 may be a pointing device or a touchscreen device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combinations thereof. Such physical gestures can be recognized and translated into commands or instructions.

Movements of the navigation features of the navigation controller 610 may be echoed on the display 604 by movements of a pointer, cursor, focus ring, or other visual indicators displayed on the display 604. For example, under the control of the applications 620, the navigation features located on the navigation controller 610 may be mapped to virtual navigation features displayed on the user interface 618. In some embodiments, the navigation controller 610 may not be a separate component but, rather, may be integrated into the platform 602 and/or the display 604.

The system 600 may include drivers (not shown) that include technology to enable users to instantly turn on and off the platform 602 with the touch of a button after initial boot-up, when enabled, for example. Program logic may allow the platform 602 to stream content to media adaptors or other content services device(s) 606 or content delivery device(s) 608 when the platform is turned "off." In addition, the chipset 612 may include hardware and/or software support for 5.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 600 may be integrated. For example, the platform 602 and the content services device(s) 606 may be integrated; the platform 602 and the content delivery device(s) 608 may be integrated; or the platform 602, the content services device(s) 606, and the content delivery device(s) 608 may be integrated. In some embodiments, the platform 602 and the display 604 are an integrated unit. The display 604 and the content service device(s) 606 may be integrated, or the display 604 and the content delivery device(s) 608 may be integrated, for example.

The system 600 may be implemented as a wireless system or a wired system. When implemented as a wireless system, the system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 602 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 6.

Figure 7:
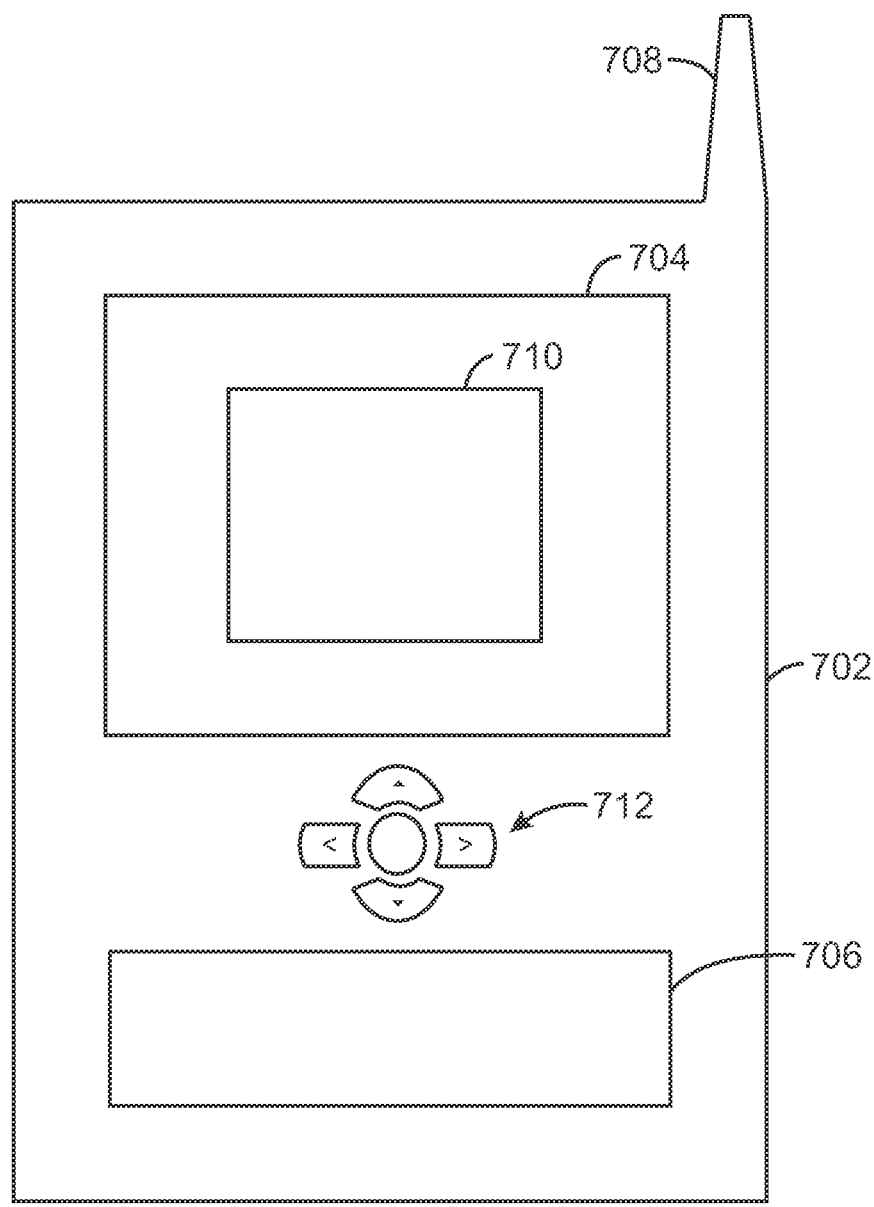
FIG. 7 is a schematic of a small form factor device in which the system of FIG. 6 may be embodied.

FIG. 7 is a schematic of a small form factor device 700 in which the system 600 of FIG. 6 may be embodied. In some embodiments, for example, the device 700 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, server computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wired or wireless mobile computing devices as well.

As shown in FIG. 7, the device 700 may include a housing 702, a display 704, an input/output (I/O) device 706, and an antenna 708. The device 700 may also include navigation features 712. The display 704 may include any suitable display 710 unit for displaying information appropriate for a mobile computing device. The I/O device 706 may include any suitable I/O device for entering information into a mobile computing device. For example, the I/O device 706 may include an alphanumeric keyboard, a numeric keypad, a touch pad, input keys, buttons, switches, rocker switches, microphones, speakers, a voice recognition device and software, or the like. Information may also be entered into the device 700 by way of microphone. Such information may be digitized by a voice recognition device.

Figure 8:
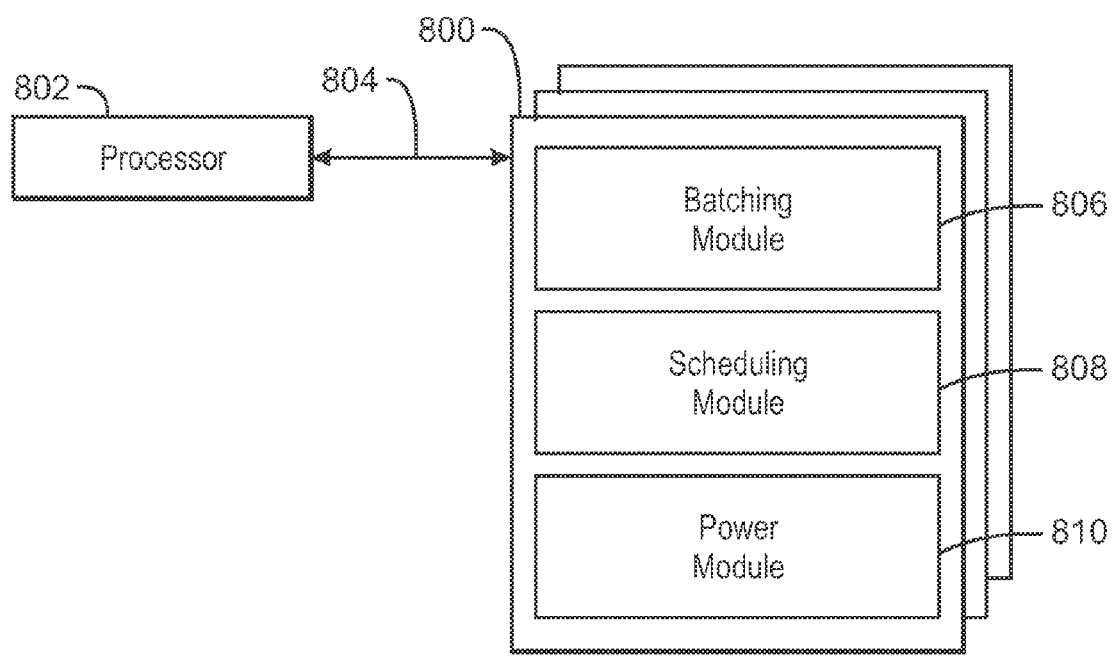
FIG. 8 is a block diagram showing tangible, non-transitory computer-readable media that stores code for a media playback workload scheduler.

FIG. 8 is a block diagram showing tangible, non-transitory computer-readable media 800 that stores code for media playback workload scheduler. The tangible, non-transitory computer-readable media 800 may be accessed by a processor 802 over a computer bus 804. Furthermore, the tangible, non-transitory computer-readable medium 800 may include code configured to direct the processor 802 to perform the methods described herein.

The various software components discussed herein may be stored on one or more tangible, non-transitory computer-readable media 800, as indicated in FIG. 8. For example, a batching module 806 may be configured to process a plurality of frames and a plurality of tracks during a single vsync cycle. A scheduling module 808 may be configured to schedule the processed frames and tracks for rendering. A power module 810 may be configured to place portions of the CPU and portions of the GPU in a low power state when the plurality of frames and the plurality of tracks have been processed The block diagram of FIG. 8 is not intended to indicate that the tangible, non-transitory computer-readable medium 800 is to include all of the components shown in FIG. 8. Further, the tangible, non-transitory computer-readable medium 800 may include any number of additional components not shown in FIG. 8, depending on the details of the specific implementation.

EXAMPLE 1

An apparatus is described herein. The apparatus includes media playback workload scheduling logic to allocate a plurality of media frames for batch media processing, logic to process the media frames, and logic to render the processed media frames.

The media playback workload scheduling logic is to allocate the plurality of media frames for batch media processing during a single vertical synchronization cycle. The plurality of frames is a batch of N frames, and the plurality of tracks is a batch of N tracks. Logic to process the media frames includes logic to decode an audio track of the data, logic to decode a frame of the data, and logic to post process the frame of the data. Additionally, logic to render the processed media frames includes logic to wait for a vertical synchronization cycle, logic to render an audio track of the data, and logic to perform an overlay flip. Logic may execute a GPU semaphore wait during processing the media frames. Further, portions of a CPU and a GPU may enter a sleep state after the media frames are processed. Additionally, the number of interrupts generated during the batch media processing is reduced.

EXAMPLE 2

A computing device is described herein. The computing device includes a graphics processing unit and a central processing unit. The central processing unit is configured to execute stored instructions. The computing device also includes and a storage device that stores instructions, wherein the storage device includes processor executable code that, when executed by the CPU, is configured to process a plurality of frames and a plurality of tracks during a single vertical synchronization cycle, schedule the processed frames and tracks for rendering, and place portions of the CPU and portions of the GPU in a low power state when the plurality of frames and the plurality of tracks have been processed.

The CPU is to process the plurality of frames and the plurality of tracks by decoding the plurality of tracks and decoding and post-processing the plurality of frames. The computing device is to place portions of the CPU and portions of the GPU in a Cx state, wherein the Cx state is a low power operating state. Additionally, the CPU is to determine the number of the plurality of frames and the plurality of tracks to be processed such that the number of transitions between a Cx state and a C0 state are reduced, wherein the Cx state is a low power operating state and a C0 state is a high power operating state. A kernel mode driver is to insert a GPU semaphore wait into one or more buffers used to store the plurality of frames and the plurality of tracks. Further, an audio render is to render the plurality of tracks and an overlay flip is performed to render the plurality of frames. A display is to display the processed plurality of frames.

EXAMPLE 3

A media playback workload scheduler is described herein. The media playback workload scheduler includes a buffer manager, a media scheduler, and a timer. The buffer manager is to allocate one or more buffers for a batch of frames and a corresponding batch of tracks. The media scheduler is to determine how many frames can be decoded in one batch so that the buffers can support an entire batch of frames. Additionally, the media scheduler is to schedule the processing of the frames and determine when to overlay flip the processed frames based on a vertical synchronization event. The timer is to monitor a vertical synchronization event by obtaining the vertical synchronization event from a kernel mode driver. The media scheduler is to schedule the processing of the frames in a manner that enables portions of a CPU and a GPU enter a sleep state after a batch of data is processed. Further, the media playback workload scheduler is to reduce the number of interrupts sent to a CPU.

EXAMPLE 4

A tangible, non-transitory, computer-readable medium is described herein. The computer-readable medium includes code to direct a processor to process a plurality of frames and a plurality of tracks during a single vertical synchronization cycle, schedule the processed plurality of frames and plurality of tracks for rendering, and place portions of the CPU and portions of the GPU in a low power state when the plurality of frames and the plurality of tracks have been processed. The plurality of frames is a batch of N frames, and the plurality of tracks is batch of N tracks. Processing the plurality of frames and the plurality of tracks include logic to decode an audio track of the data, logic to decode a frame of the data, and logic to post process the frame of the data. Additionally, the processed plurality of frames and the processed plurality of tracks may be rendered by waiting for a vertical synchronization cycle, rendering an audio track of the data, and performing an overlay flip. Additionally, a GPU semaphore wait may be executed during processing of the plurality of frames and plurality of tracks for rendering.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus comprising:
a processor configured to execute logic;
media playback workload scheduling logic to allocate a plurality of media frames for batch media processing, wherein the media playback workload scheduling logic is to allocate the plurality of media frames for batch media processing during a single vertical synchronization cycle, and wherein the plurality of media frames are to be processed such that the number of transitions between a power operating state and a high power operating state are reduced;
logic to process the media frames; and
logic to render the processed media frames.

2. The apparatus of claim 1, wherein the plurality of media frames is a batch of N frames with a plurality of corresponding tracks, and a plurality of tracks is a batch of N tracks.

3. The apparatus of claim 1, wherein logic to process the media frames comprises:
logic to decode an audio track of the data;
logic to decode a frame of the data; and
logic to post process the frame of the data.

4. The apparatus of claim 1, wherein logic to render the processed media frames comprises:
logic to wait for a vertical synchronization cycle;
logic to render an audio track of the data; and
logic to perform an overlay flip.

5. The apparatus of claim 1, comprising logic to execute a GPU semaphore wait during processing the media frames.

6. The apparatus of claim 1, wherein portions of a CPU and a GPU enter a sleep state after the media frames are processed.

7. The apparatus of claim 1, wherein the number of interrupts generated during the batch media processing is reduced.

8. A computing device, comprising:
   a graphics processing unit; and
   a central processing unit (CPU) that is configured to execute stored instructions and a storage device that stores instructions, wherein the storage device includes processor executable code that, when executed by the CPU, is configured to:
   process a plurality of frames and a plurality of tracks during a single vertical synchronization cycle;
   schedule the processed frames and tracks for rendering;
   place portions of the CPU and portions of the GPU in a low power state when the plurality of frames and the plurality of tracks have been processed; and
   wherein the CPU is to determine the number of the plurality of frames and the plurality of tracks to be processed such that the number of transitions between a Cx state and a C0 state are reduced, wherein the Cx state is a low power operating state and a C0 state is a high power operating state.

9. The computing device of claim 8, wherein the CPU is to process the plurality of frames and the plurality of tracks by decoding the plurality of tracks and decoding and post-processing the plurality of frames.

10. The computing device of claim 8, wherein the computing device is to place portions of the CPU and portions of the GPU in a Cx state, wherein the Cx state is a low power operating state.

11. The computing device of claim 8, comprising a kernel mode driver that is to insert a GPU semaphore wait into one or more buffers used to store the plurality of frames and the plurality of tracks.

12. The computing device of claim 8, wherein an audio render is to render the plurality of tracks and an overlay flip is performed to render the plurality of frames.

13. The computing device of claim 8, wherein a display is to display the processed plurality of frames.

14. A media playback workload scheduler, comprising:
   a buffer manager to allocate one or more buffers for a batch of frames and a corresponding batch of tracks;
   a media scheduler, where the media scheduler is to schedule the processing of the frames and determine when to overlay flip the processed frames based on a vertical synchronization event; and
   a timer.

15. The media playback workload scheduler of claim 14, wherein the media scheduler is to determine how many frames can be decoded in one batch so that the buffers can support an entire batch of frames.

16. The media playback workload scheduler of claim 14, wherein the timer is to monitor a vertical synchronization event by obtaining the vertical synchronization event from a kernel mode driver.

17. The media playback workload scheduler of claim 14, wherein the media scheduler is to schedule the processing of the frames in a manner that enables portions of a CPU and a GPU enter a sleep state after a batch of data is processed.

18. The media playback workload scheduler of claim 14, wherein the media playback workload scheduler is to reduce the number of interrupts sent to a CPU.

19. A tangible, non-transitory, computer-readable medium comprising code to direct a processor to:
   determine a number of a plurality of frames and a plurality of tracks to be processed such that the number of transitions between a Cx state and a C0 state are reduced, wherein the Cx state is a low power operating state and a C0 state is a high power operating state;
   process the plurality of frames and a plurality of tracks during a single vertical synchronization cycle;
   schedule the processed plurality of frames and plurality of tracks for rendering; and
   place portions of the CPU and portions of the GPU in the low power operating state when the plurality of frames and the plurality of tracks have been processed.

20. The computer-readable medium of claim 19, wherein the plurality of frames is a batch of N frames, and the plurality of tracks is batch of N tracks.

21. The computer-readable medium of claim 19, wherein processing the plurality of frames and the plurality of tracks comprises code to:
   decode an audio track of the data;
   decode a frame of the data; and
   post process the frame of the data.

22. The computer-readable medium of claim 19, further comprising rendering the processed plurality of frames and the processed plurality of tracks by:
   waiting for a vertical synchronization cycle;
   rendering an audio track of the data; and
   performing an overlay flip.

23. The computer-readable medium of claim 19, comprising executing a GPU semaphore wait during processing of the plurality of frames and plurality of tracks for rendering.

* * * * *